(12) United States Patent
Seals et al.

(10) Patent No.: US 8,974,719 B2
(45) Date of Patent: Mar. 10, 2015

(54) COMPOSITE MATERIALS FORMED WITH ANCHORED NANOSTRUCTURES

(75) Inventors: Roland D. Seals, Oak Ridge, TN (US);
Paul A. Menchhofer, Clinton, TN (US);
Jane Y. Howe, Oak Ridge, TN (US);
Wei Wang, Oak Ridge, TN (US)

(73) Assignee: Consolidated Nuclear Security, LLC, Reston, VA (US)

( * ) Notice: Subject to any disclaimer, the term of this patent is extended or adjusted under 35 U.S.C. 154(b) by 536 days.

(21) Appl. No.: 12/704,564

(22) Filed: Feb. 12, 2010

(65) Prior Publication Data
US 2013/0029836 A1    Jan. 31, 2013

Related U.S. Application Data

(60) Provisional application No. 61/152,378, filed on Feb. 13, 2009.

(51) Int. Cl.
*B28B 1/00* (2006.01)
*B28B 3/00* (2006.01)
*B28B 5/00* (2006.01)
(Continued)

(52) U.S. Cl.
CPC ............... *B01J 23/74* (2013.01); *B01J 23/745* (2013.01); *B01J 35/0013* (2013.01); *B01J 35/006* (2013.01); *B01J 37/0207* (2013.01); *B01J 37/0217* (2013.01); *B01J 37/0221* (2013.01); *B01J 37/033* (2013.01); *B01J 37/18* (2013.01); *B22F 1/025* (2013.01); *C22C 29/08* (2013.01); *Y10S 977/742* (2013.01); *Y10S 977/773* (2013.01); *Y10S 977/843* (2013.01)
USPC ........... 264/603; 977/742; 977/773; 977/843; 502/177; 419/45; 419/46

(58) Field of Classification Search
None
See application file for complete search history.

(56) References Cited

U.S. PATENT DOCUMENTS 3,489,694 A    1/1970   Weidlich et al.
3,927,186 A   12/1975   Vinton et al.
(Continued)

FOREIGN PATENT DOCUMENTS

WO    WO 2004096725 A2 *   11/2004

OTHER PUBLICATIONS

Huang et al., "Manufacture and electrical properties of multiwalled carbon nanotube/BaTiO3 nano composite ceramics", Journal of Materials Chemistry, Jun. 22, 2004, pp. 2536-2541.*
(Continued)

*Primary Examiner* — Lisa Herring
(74) *Attorney, Agent, or Firm* — Michael J. Renner, Esq.; Luedeka Neely Group, P.C.

(57) ABSTRACT

A method of forming nano-structure composite materials that have a binder material and a nanostructure fiber material is described. A precursor material may be formed using a mixture of at least one metal powder and anchored nanostructure materials. The metal powder mixture may be (a) Ni powder and (b) NiAl powder. The anchored nanostructure materials may comprise (i) NiAl powder as a support material and (ii) carbon nanotubes attached to nanoparticles adjacent to a surface of the support material. The process of forming nano-structure composite materials typically involves sintering the mixture under vacuum in a die. When Ni and NiAl are used in the metal powder mixture $Ni_3Al$ may form as the binder material after sintering. The mixture is sintered until it consolidates to form the nano-structure composite material.

18 Claims, 9 Drawing Sheets

(51) Int. Cl.

| | |
|---|---|
| *B22F 1/00* | (2006.01) |
| *B01J 23/74* | (2006.01) |
| *B01J 23/745* | (2006.01) |
| *B01J 35/00* | (2006.01) |
| *B01J 37/02* | (2006.01) |
| *B01J 37/03* | (2006.01) |
| *B01J 37/18* | (2006.01) |
| *B22F 1/02* | (2006.01) |
| *C22C 29/08* | (2006.01) |

(56) References Cited

U.S. PATENT DOCUMENTS

| | | | | |
|---|---|---|---|---|
| 5,271,758 | A | * | 12/1993 | Buljan et al. ............... 75/232 |
| 5,608,911 | A | * | 3/1997 | Shaw et al. ............... 419/45 |
| 6,420,293 | B1 | | 7/2002 | Chang et al. |
| 6,632,530 | B1 | | 10/2003 | Clough |
| 6,652,967 | B2 | | 11/2003 | Yadav et al. |
| 6,660,959 | B2 | | 12/2003 | Vallance et al. |
| 6,676,919 | B1 | | 1/2004 | Fischer et al. |
| 6,746,508 | B1 | | 6/2004 | Deevi et al. |
| 6,746,597 | B2 | | 6/2004 | Zhou et al. |
| 7,125,534 | B1 | | 10/2006 | Smalley et al. |
| 7,166,663 | B2 | | 1/2007 | Cayton et al. |
| 2002/0046953 | A1 | | 4/2002 | Lee et al. |
| 2002/0109086 | A1 | | 8/2002 | Colbert et al. |
| 2002/0127171 | A1 | | 9/2002 | Smalley et al. |
| 2003/0042834 | A1 | | 3/2003 | Dean et al. |
| 2003/0104936 | A1 | | 6/2003 | Mao et al. |
| 2004/0005269 | A1 | | 1/2004 | Huang et al. |
| 2004/0105807 | A1 | | 6/2004 | Fan et al. |
| 2004/0199019 | A1 | | 10/2004 | Schmidt |
| 2004/0241080 | A1 | | 12/2004 | Nagy et al. |
| 2006/0104889 | A1 | | 5/2006 | Harutyunyan et al. |
| 2006/0177659 | A1 | | 8/2006 | Chen et al. |
| 2006/0228282 | A1 | | 10/2006 | Zhou et al. |
| 2007/0026294 | A1 | | 2/2007 | Shimazaki et al. |
| 2007/0035226 | A1 | | 2/2007 | Ganapathiraman et al. |
| 2007/0049488 | A1 | | 3/2007 | Reyes et al. |
| 2007/0074601 | A1 | | 4/2007 | Hong et al. |
| 2007/0180760 | A1 | | 8/2007 | Zhou et al. |
| 2007/0184970 | A1 | | 8/2007 | Gao |
| 2007/0191221 | A1 | | 8/2007 | Hussain et al. |
| 2008/0045401 | A1 | | 2/2008 | Zhou et al. |
| 2008/0193368 | A1 | | 8/2008 | Wu et al. |
| 2008/0206463 | A1 | | 8/2008 | Grigorian et al. |
| 2008/0206562 | A1 | | 8/2008 | Stucky et al. |
| 2008/0213154 | A1 | | 9/2008 | Kalck et al. |
| 2008/0271606 | A1 | | 11/2008 | Holmes et al. |
| 2008/0280136 | A1 | * | 11/2008 | Zachariah et al. ............ 428/367 |
| 2009/0186214 | A1 | * | 7/2009 | Lafdi et al. ............ 428/336 |
| 2009/0226704 | A1 | | 9/2009 | Kauppinin et al. |

OTHER PUBLICATIONS

Chai et al., "The Examination of NiO and CoOx Catalysts Supported on Al2O3 and SiO2 for Carbon Nanotubes Production by Catalytic Chemical Vapor Deposition of Methane", Carbon—Sci. Tech. 1 (2008), pp. 24-29.*

Vahlas et al., "Principles and applications of CVD powder technology", Matl. Sci. Eng. R 53 (2006), pp. 1-72.*

Song et al., "The growth mode change in carbon nanotube synthesis in plasma-enhanced chemical vapor deposition", Diamond and Related Matls. 13 (2004), pp. 1210-1213.*

Gohier et al., "Carbon nanotube growth mechanism switches from tip-to base-growth with decreasing catalyst particle size", Carbon, Jul. 2008, pp. 1331-1338.*

Teo et al., "Catalytic Synthesis of Carbon Nanotubes and Nanofibers", Encyclopedia of Nanoscience and Nanotechnology, vol. X, pp. 1-22, (2003).*

Curtzwiler, G. et al., Journal of Applied Polymer Science, 2008, vol. 109, pp. 218-225.

An, Jeong-Wook et al., Journal of Ceramic Processing Research, 2002, vol. 3, No. 3, pp. 174-177.

Chunnian He et al., An Approach to Obtaining Homogeneously Dispersed Carbon Nanotubes in Al Powders for Preparing Reinforced Al-Matrix Composites, Advanced Materials 2007, vol. 19, pp. 1128-1132.

J.Y. Hwang et al., Laser-deposited carbon nanotube reinforced nickel matrix composites, Sripta Materialia 2008, vol. 59, pp. 487-490.

W.X. Chen et al., Tribological application of carbon nanotubes in a metal-based composite coating and composites, Carbon 2003, vol. 41, pp. 215-222.

http://www.designnews.com/index.asp?layout=articlePrint&articleID=CA86761, Take a nano powder Mar. 1, 1999 (2 pages).

Joo, Ji Bong, et al., "Preparation and Characterization of a PtSn Nanocatalyst for Use in Ethanol Electro-Oxidation". Journal of Nanoscience and Nanotechnology, vol. 8, 5130-4134, 2008.

Reddy, A, Satyanarayana, et al., "Synthesis of thermally stable metal-oxide hybrid nanocatalyst with encapsulation of Pt and Ru nanoparticles." 18th International Conference of Composite Materials, p. 1-6, no date available, Jul. 2009.

Chiang, Wei-Hung, "Engineering Nanocatalysts for Selective Growth of Carbon". Doctoral Thesis submitted at Case Western Reserve University, May 2009, pp. 1-162.

* cited by examiner

COMPOSITE MATERIALS FORMED WITH ANCHORED NANOSTRUCTURES

CROSS REFERENCES TO RELATED APPLICATIONS

This patent application claims priority from and is related to U.S. Provisional Patent Application No. 61/152,378 filed 13 Feb. 2009, entitled "Composite Materials Formed with Anchored Nanostructures." Provisional Patent Application No. 61/152,378 is incorporated by reference in its entirety herein.

GOVERNMENT RIGHTS

The U.S. Government has rights to this invention pursuant to contract number DE-AC05-00OR22800 between the U.S. Department of Energy and Babcock & Wilcox Technical Services Y-12, LLC.

This invention was made with government support under Contract No. DE-AC05-00OR22725 awarded by the U.S. Department of Energy. The government has certain rights in the invention.

FIELD

This disclosure relates to the field of composite materials. More particularly, this disclosure relates to composite materials formed with anchored nanostructures.

BACKGROUND

Nanostructures are objects that have physical dimensions between those of sub-atomic-scale (less than one Angstrom-sized) structures and microscopic-scale (greater than one tenth micrometer-sized) structures. Nanostructures are said to have nano-scale features. "Nano-scale" refers to a dimension that is between approximately one Angstrom (0.1 nanometer) and approximately 100 nanometers (0.1 micrometer). Nano-scale features may occur in one, two, or three dimensions. For example, nano-textured surfaces have one nano-scale dimension. That is, such surfaces have nano-features such as ridges, valleys or plateaus that provide surface height variations that range from about 0.1 to about 100 nanometers. Another example of a one-dimension nanostructure is a film that has a thickness that ranges from about 0.1 to about 100 nanometers. Nanotubes are examples of nanostructures that have two nano-scale dimensions. That is, a nanotube has a diametral dimension and a length. The diametral dimension of a nanotube ranges from about 0.1 to about 100 nanometers. The length of a nanotube may be greater than hundreds of microns. Nanoparticles have three diametral nano-scale dimensions. Each diametral dimension of a nanoparticle ranges from about 0.1 to about 100 nm.

Nanostructures may be formed from carbon, silicon, boron, various metal and metalloid elements, various compounds, alloys and oxides of those elements, ceramics, various organic materials including monomers and polymers, and potentially any other material. Nanostructures have potential use in various physical, chemical, mechanical, electronic and biological applications. Nanomaterials are collections of nanostructures. The formation, collection, and assembly of nanomaterials generally involve difficult and expensive processes.

It is often desirable to manufacture composite materials that comprise a metal or ceramic as the "binder" (or "bulk") material with embedded nanostructures as the "fiber" (or "filler") material. One difficulty in manufacturing such materials is that nanostructures tend to agglomerate and are difficult to disperse evenly in a composite material. Another difficulty in manufacturing composite materials having embedded nanostructures is that it is sometimes difficult to achieve sufficient bond strength between the matrix material and the filler material. What are needed therefore are raw materials and methods for manufacturing composite materials with embedded nanostructures.

SUMMARY

In some embodiments the present disclosure provides a method of forming a nano-structure composite material having a binder material and a fiber material and the method includes the following steps, which may be performed in any order. One step is typically forming a mixture that includes (1) at least one powder, and (2) anchored nano-structured materials comprising (i) a powder support material and (ii) carbon nanotubes directly anchored to a surface of the metal powder support material as the fiber material, where the at least one powder and the powder support material form the binder material. A further step typically includes consolidating the mixture to form the nano-structure composite material. In some embodiments of this method the carbon nanotubes comprise between about 0.5 wt. % and about 5 wt. % of the mixture that includes (1) the at least one powder and (2) the anchored nano-structured materials. In some embodiments the carbon nanotubes comprise between about 0.5 wt. % and about 50 wt. % of the mixture that includes (1) the at least one powder and (2) the anchored nano-structured materials. In some embodiments the at least one powder comprises Ni powder and NiAl powder, and the anchored nano-structured materials comprise (i) NiAl powder support material and (ii) carbon nanotubes anchored directly to a surface of NiAl powder support material as the fiber material. In some embodiments the at least one powder comprises Ni powder and NiAl powder, and the anchored nano-structured materials comprise (i) NiAl powder support material and (ii) carbon nanotubes anchored directly to a surface of the support material as the fiber material, and the quantity of Ni powder and the quantity of NiAl powder and the quantity of anchored nano-structured materials are in approximately a stoichiometric ratio that is selected to predominantly yield Ni3Al as the binder material after sintering. Some embodiments include a step of mixing a powder comprising tungsten carbide with the mixture that includes (1) the at least one powder and (2) the anchored nano-structured materials, to form a combined mixture, and then consolidating the combined mixture to form the nano-structure composite material. Some embodiments include a step of mixing a powder comprising tungsten carbide with the mixture that includes (1) the at least one powder and (2) the anchored nano-structured materials, to form a combined mixture, and then consolidating the combined mixture to form the nano-structure material, wherein the tungsten carbide comprises between about 40 vol. % and about 60 vol. % of the combined volume of tungsten carbide and mixture that includes (1) the at least one powder and (2) the anchored nano-structured materials. Some embodiments include a step of mixing a powder comprising boron carbide with the mixture that includes (1) the at least one powder, and (2) the anchored nano-structured materials to form a combined mixture, and then sintering the combined mixture to form the nano-structure composite material. Some embodiments include a step of mixing a powder comprising boron carbide with the mixture that includes (1) the at least one powder and (2) the anchored nano-structured materials, to form a combined mixture, and then sintering the combined mixture to form the nanostructured material, wherein the boron carbide comprises between about 40 vol. % and about 60 vol. % of the combined volume of boron carbide and the mixture that includes (1) the at least one powder and (2) the anchored nano-structured materials. Some embodiments include a step of mixing a powder comprising diamond particles with the mixture that includes (1) the at least one powder and (2) the anchored nano-structured materials, to form a combined mixture, and then sintering the combined mixture to form the nano-composite material.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred embodiments, reference is made to the accompanying drawings, which form a part hereof, and within which are shown by way of illustration the practice of specific embodiments of methods of fabricating nano-catalysts. It is to be understood that other embodiments may be utilized, and that structural changes may be made and processes may vary in other embodiments.

Disclosed herein are various processes for fabricating nano-catalysts that have utility for forming nanostructures and manufacturing nanomaterials. In some embodiments the nano-catalysts include nanoparticles that are disposed adjacent the surface of powder particles. The nanoparticles are typically metal. The powder particles are typically metal or ceramic particles. Nano-catalysts that have nanoparticles disposed adjacent the surface of powder particles are an example of powder-based nano-catalysts.

Powder-based nano-catalysts may be used in various processes to produce nanostructures and nanomaterials. For example, powder-based nano-catalysts may be used to grow carbon nanotubes that may be harvested and used as nanomaterials. The powder-based nano-catalysts may also be incorporated as a constituent of components and coatings that then have catalytic properties for enhancing the formation of nanostructures within the component or the coating. That is, instead of first fabricating and collecting nanostructures as nanomaterials and then mixing those nanomaterials with other constituents to form nanostructure-bearing composite materials, powder-based nano-catalysts may be mixed with other constituents and nanostructures may then be grown in-situ to form nanostructure-bearing composite materials. The nanostructure-bearing composite material may be formed as a layer that is disposed adjacent the surface of a component or the nanostructure-bearing composite material may be formed as a portion or all of the bulk material of the component.

Chemical processes may be used to form nanoparticles adjacent the surface of powder materials of interest. That is, the powder materials of interest may be chemically treated in a solution to deposit nano-size catalyst particles adjacent the surface of the powders by precipitation or reactive precipitation processes. Such techniques may be applied to virtually any ceramic or metal powders or powders formed from combinations of metals and ceramics. For example, all Sc containing metals, alloys, and intermetallics; all Ni containing metals, alloys, and intermetallics; all Fe containing metals, alloys, and intermetallics; all Cr containing metals, alloys, and intermetallics; all Co containing metals, alloys, and intermetallics; all Ti containing metals, alloys, and intermetallics; all V containing metals, alloys, and intermetallics; all Mn containing metals, alloys, and intermetallics; all Cu containing metals, alloys, and intermetallics; and all Zn containing metals, alloys, and intermetallics may be used. Y, Zr, Nb, Ru, Rh, Pd, Hf, Ta, W, Re, Ir, Pt, and Au containing metals, alloys, and intermetallics may also be used, as well as, Ce, Th, and U containing metals, alloys, and intermetallics.

The following provides detailed descriptions of various embodiments, including nanoparticle generation and the production of nano-catalysts by deposition of the nanoparticles on the surface of selected metal, metal alloy, or ceramic powders or powders that included mixtures of those materials. The powder-based nano-catalysts having nanoparticles adjacent the surfaces of the powder particles' surfaces are referred to as metal-powder-based nano-catalysts or as ceramic-powder-based nano-catalysts depending on whether the powder is a metal or a ceramic. Powder-based nano-catalysts may also be formed from silicon or other metalloid powders; such nano-catalysts are categorized as metal-based-powder nano-catalysts.

The surfaces of a substrate material having the shape of a geometric solid may also be used to support nano-size catalyst particles. Such structures are referred to herein as "solid-based nano-catalysts." Solid-based nano-catalysts may utilize a silicon wafer or other ceramic material as a substrate. Powder-based nano-catalysts and solid-based nano-catalysts are collectively referred to herein as "nano-catalysts."

To facilitate the formation of nano-catalysts on the surfaces of powders or solid substrates, a "complexing agent" may be added to the surface of a powder or a substrate. As used herein the term "complexing agent" refers to a coupling agent, a chelating agent, or a similar chemical structure that facilitates the binding of metal ions to the powder or substrate by such mechanisms as a chemical ionic bond or a chemical covalent bond or a chemical coordinate covalent bond or a chemical attraction resulting from electro-negative/positive effects. With a coupling agent, an atom (e.g., a metal ion) of the nano-catalyst is bound to a single atom (e.g., an oxygen ion) of the complexing agent, whereas with a chelating agent, an atom (e.g., a metal ion) of the nano-catalyst is bound to two or more atoms (e.g., two oxygen ions, or an oxygen ion and a nitrogen ion, or multiples of such ions) of the complexing agent. A carboxyl functional group (—COO⁻) is an example of a coupling agent, while ethylene diamine tetraacetic acid (EDTA) is an example of a chelating agent.

Figure 1:
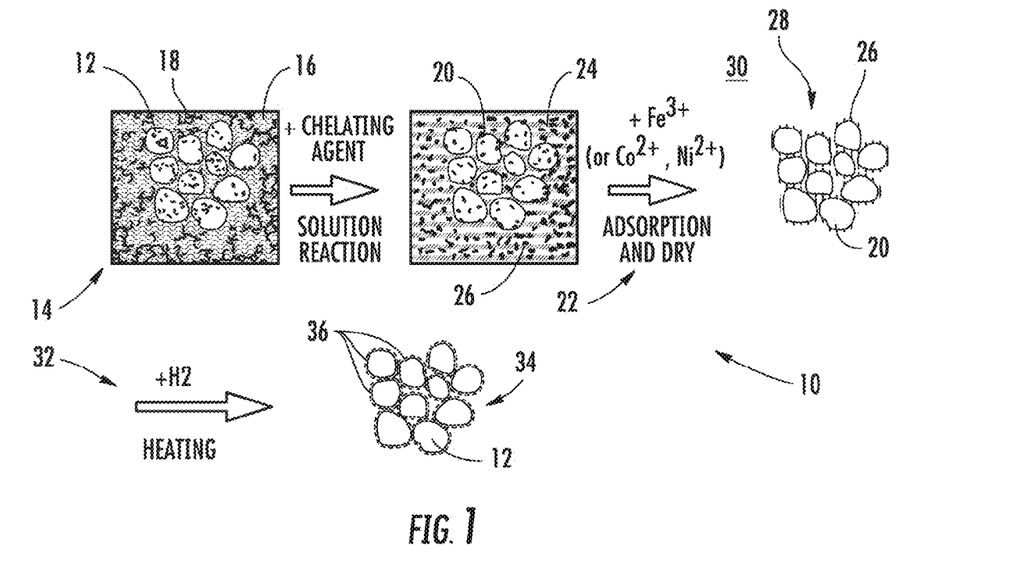
FIG. 1 is a somewhat schematic illustration of a method of fabricating nano-catalysts.

FIG. 1 illustrates an embodiment of a process 10 for forming metal-powder-based nano-catalysts. In a typical formulation, 100 g of metal powder 12 is mixed in a first solution 14. Before mixing with the first solution 14 the metal powder 12 may be washed with deionized water (1 liter of water is typically sufficient) to clean off residual dust and debris, although typically this is not necessary. The metal powder 12 may also be washed with an acid, such as hydrochloric acid, to activate its surface. The metal powder 12 may, for example, be NiAl powder having particle sizes that range from about 10 nanometers to about 100 microns in diameter. NiAl powders and other powders ranging from about 0.5 microns to about 60 microns in diameter are typical. Such powders are referred to herein as powder particles. The first solution 14 typically includes (a) a mixture 16 of (1) ethanol (ranging from about 0 wt. % to about 50 wt. %) and (2) water (ranging from about 50 wt. % to about 100 wt. %) and (b) a chelating agent 18 (ranging from about 0.05 wt. % to about 0.5 wt. %). The chelating agent 18 may be ethylene diamine tetraacetic acid (EDTA) or a similar chemical. Generally the metal powder 12 is mixed with the first solution 14 for approximately 30 minutes using an ultrasonic bath. The first solution 14 and the metal powder 12 are then allowed to stand, typically for at least approximately an hour up to about 6 hours (but overnight or up to 12 hours is not deleterious). This mixing and soaking produces a chelated metal powder 20.

The process 10 includes a step 22 that involves (a) separating the chelated metal powder 20 from the residual first solution 14, typically by pouring the mixture of the first solution 14 and the chelated metal powder 20 through a filter and (b) washing the chelated metal powder 20 with deionized water to remove excess chelating agent 18 that may have accumulated with the chelated metal powder 20. The chelated metal powder 20 is then added to a second solution 24 that includes metal ions 26. The second solution 24 may be 250 ml of a 0.001M to 1M (preferably 0.1M) solution of $FeCl_3$, which of course contains $Fe^{3+}$ ions. In other embodiments solutions containing other metal ions such as $Co^{2-}$, $Co^{3+}$, or $Ni^{2+}$ may be used. The chelated metal powder 20 and the second solution 24 are stirred for about thirty minutes to about six hours or longer and then filtered to remove "loaded" metal powder 28 from the supernatant (residual) second solution 24. As used herein the term "loaded" refers to a configuration where ions are bound to (as in a chemical ionic bond or a chemical covalent bond or a chemical attraction resulting from electronegative/positive effects) a surface of an element either directly or through an intermediate material. In this case the metal ions 26 are bound to the chelated metal powder 20 by the chelating agent 18. The loaded metal powder 28 may then be washed with deionized water to remove excess $Fe^{3+}$ ions. The wash water containing $Fe^{3+}$ ions may be analyzed by UV-visible spectroscopy to determine the concentration of $Fe^{3+}$ in the wash water. The loaded metal powder 28 may then be dried under a vacuum (step 30), or it may be air dried.

In some instances it may be desirable to determine the quantity of $Fe^{3+}$ ions that are loaded on the loaded metal powder 28. This may be determined by using UV-visible spectroscopy to determine the concentration of $Fe^{3+}$ ions that were retained in the residual second solution 24 after the loaded metal powder 28 was filtered from the residual second solution 24 and the concentration of $Fe^{3+}$ ions that were washed from the loaded metal powder 28, and then using the volume of each solution to calculate the moles of $Fe^{3+}$ that were removed by those processes, and then subtracting that removed quantity from the total starting quantity of moles of $Fe^{3+}$ in the first solution 14 to determine the number of moles of $Fe^{3+}$ ions loaded on the loaded metal powder 28. Typically the concentration of $Fe^{3+}$ ions (i.e., the metal ions 26) loaded on to the surface of loaded metal powder 28 (where the loaded metal powder 28 is NiAl) is about $3 \times 10^{-7}$ grams of $Fe^{3+}$ per gram of loaded metal powder 28 when the solution is approximately 0.001M $FeCl_3$. The loaded amount may be increased by using higher concentrations of $FeCl_3$ solutions.

The final step 32 for producing a metal-powder-based nano-catalyst 34 is contacting the dried loaded metal powder 28 with a reducing environment. In a preferred method of reducing the metal ions, the loaded metal powder 28 may be placed under a hydrogen atmosphere preferably containing about 4 wt. % hydrogen and about 96 wt. % argon, at a temperature above about 400° C. (generally 500-850° C.) for at least approximately 5 minutes. The preferred reducing agent is hydrogen ($H_2$) gas. The $H_2$ concentration may be in a range from just above 0% up to 100% $H_2$. A composition comprising about 4% $H_2$ is typically used because it is more effective than lower concentrations of $H_2$, and higher concentrations may introduce safety concerns regarding explosion or fire. The carrier gas for $H_2$ may be any inert gas, but Argon (Ar) is a preferred carrier for $H_2$ because Ar has very low chemical reactivity. Step 32 is used to reduce the metal ions 26 and form the metal-powder-based nano-catalyst 34 as metal nanoparticles 36 on the metal powder 12. Extending the time of exposure to the reducing environment to about 30 minutes increases the percentage of the metal ions 26 that are reduced, and an exposure time of approximately one hour may increase the percentage. Exposure times beyond about two hours have diminishing returns with approximately twenty four hours of exposure being the limit for any statistically significant increase.

In some embodiments a ceramic-powder-based nano-catalyst may be formed using silica (silicon dioxide) powder by producing mono-dispersed silica nanoparticles that are synthesized using wet colloidal chemical methods. A chelating process or a coupling agent process may be used to attach functional groups to the silica particle surfaces followed by loading metal ions onto the functionalized silica particles. Nano-catalysts may also be produced from ceramic powders by washing them with salt solutions as described herein for producing nanocatalysts from metal powders. The ceramic-powder-based nano-catalysts may then be produced by chemical reduction of the metal ions in solution or by hydrogen reduction in the solid phase at high temperature.

Figure 2:
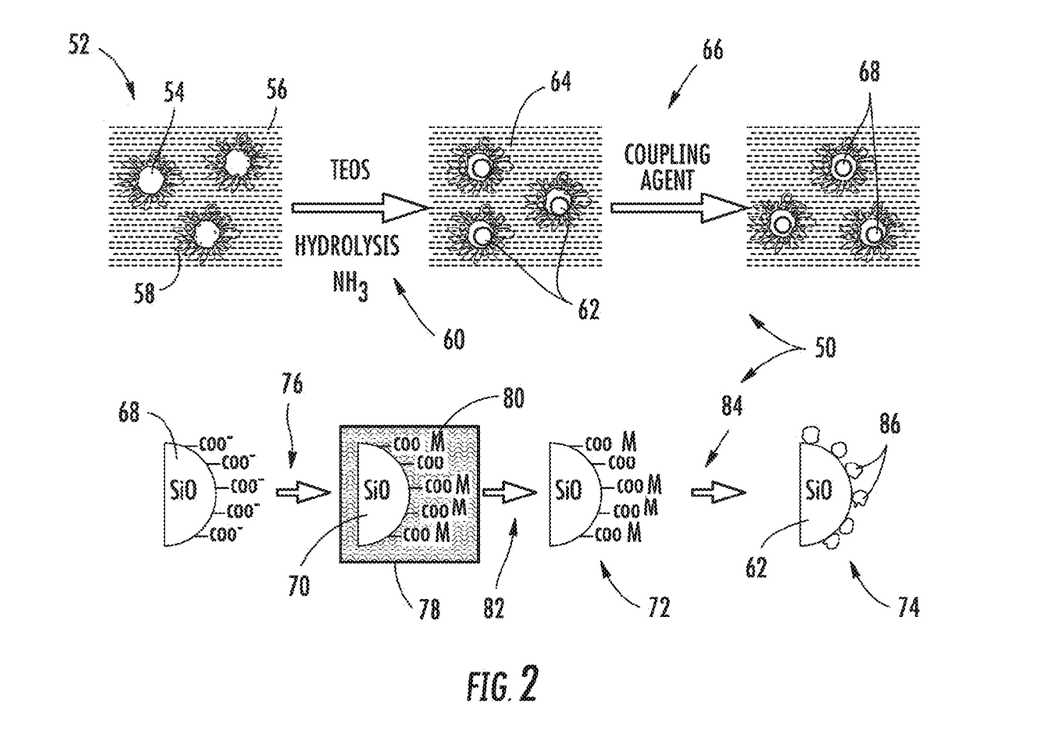
FIG. 2 is a somewhat schematic illustration of a method of fabricating nano-catalysts.

FIG. 2 illustrates an embodiment of a method for fabricating a ceramic-powder-based nano-catalyst. The process 50 begins with forming a microemulsion medium 52 that typically comprises water droplets 54, oil 56, and a surfactant 58. The oil 56 is typically hexanol or cyclohexane or a mixture ranging from about 0 wt. % to about 20 wt. % hexanol and from about 80 wt. % to about 100 wt. % cyclohexane. The water droplets 54 typically comprise from about 5 wt. % to about 15 wt. % of the total microemulsion medium 52, the oil 56 typically comprises from about 50 wt. % to about 90 wt. % of the total microemulsion medium 52, and the surfactant 58 typically comprises from about 5 wt. % to about 15 wt. % of the total microemulsion medium 52. A polyethylene glycol p-tert-octylphenyl ether, such as commercially available TRITON-1010 may be used as the surfactant. Another suitable surfactant is tert-octylphenoxy poly(ethyhleneoxy)ethanol sold commercially under the trade name IGEPAL (® Canada only). In the process depicted in FIG. 2, water-in-oil microemulsions such as this serve as nanoreactors to produce components of the ceramic-powder-based nano-catalysts.

The process 50 continues with mixing an organic silane with the microemulsion in the presence of ammonia to form silicon dioxide nanoparticles. Typically from about 20 gr. to about 100 gr. of tetraethoxysilane (TEOS)-Si(OC$_2$H$_5$)$_4$ and from about 2 gr. to about 5 gr. of ammonia (NH$_3$) are mixed to form approximately 200 to about 1000 gr. of microemulsion medium 52 to initiate a TEOS hydrolysis process 60. That is, silicon dioxide nanospheres are grown in the water droplets 54 by hydrolysis of tetraethoxysilane (TEOS) in the presence of NH$_3$ catalysts. The reaction produces amorphous silicon dioxide nanoparticles 62 that are approximately spherical and that typically range from about 50 to about 500 nm in diameter, however diameters ranging from about 10 nm to about 10 μm are possible. The reactions are a follows:

The silicon dioxide nanoparticles 62 in a reaction solution 64 are then surface modified by hydrolysis of the organosilane (a silicon alkoxide) to form functional groups —COO$^-$. A coupling agent such as a sodium salt of N-(trimethoxysilylpropyl)ethylenediamne triacetate may be added to the reaction solution 64 in an amount ranging from about 0.2 wt. % to about 1 wt % based on the total weight of the reaction solution 64 to initiate a process 66 that modifies the surface of the silicon dioxide nanoparticles 62 to form functionalized silicon dioxide nanoparticles 68. Typically the process involves modifying the silicon dioxide nanoparticles 62 to add functional groups, such as carboxyl functional groups (—COO$^-$) (a coupling agent) that have enhanced affinity for metal ions. After their formation the functionalized silicon dioxide nanoparticles 68 may then be removed from the reaction solution 64 by, for example, a process of destabilization (e.g., centrifugation) and the collected particles may be washed in an alcohol and water mixture. For simplicity of illustration the various forms of silicon dioxide nanoparticles (68, 70, 72, and the 62 portion of 74) shown in the lower portion of FIG. 2 are portrayed as hemispheres, although in reality they are substantially spherical in form as shown in the upper portion of FIG. 2.

Metal ions, such as Fe$^{3+}$, Co$^{2+}$, and Ni$^{2+}$ may be loaded onto the surface of the functionalized silicon dioxide nanoparticles wherein the metal ions are substantially homogeneously attracted to, attached to, or adsorbed to the surface functional groups. For example, in a step 76 the functionalized silicon dioxide nanoparticles 68 may be mixed in a solution 78 comprising metal ions 80 to produce loaded silicon dioxide nanoparticles 70 wherein the metal ions are bound to (as in a chemical ionic bond or a chemical covalent bond or a chemical attraction resulting from electro-negative/positive effects) the functionalized silicon dioxide nanoparticles.

In this embodiment the method of fabricating a ceramic-powder-based nano-catalyst then proceeds with a step 82 for separating the loaded silicon dioxide nanoparticles 70 from substantially all of the residual solution 78 to produce dry loaded silicon dioxide nanoparticles 72. For example, the loaded silicon dioxide nanoparticles 70 may be separated from substantially all of the residual solution 78 by centrifuging the mixture and drying the loaded silicon dioxide nanoparticles 70 in a vacuum, or air drying under a hood.

The final step 84 for producing the ceramic-powder-based nano-catalyst is to expose the dried loaded silicon dioxide nanoparticles 72 to a reducing environment such as by placing the dried loaded silicon dioxide nanoparticles 72 under a hydrogen atmosphere (such as an atmosphere containing about 4 wt. % hydrogen and about 96 wt. % argon) at a temperature ranging from about 400° C. to about 1200° C. (typically from about 500° C. to about 850° C.) for approximately 5 minutes, to reduce the metal ions to metal and form the ceramic-powder-based nano-catalyst 74 as metal nanoparticles 86 on the silicon dioxide nanoparticles 62. Extending the exposure time to a range from about 30 minutes to about 2 hours may be beneficial.

Figure 3:
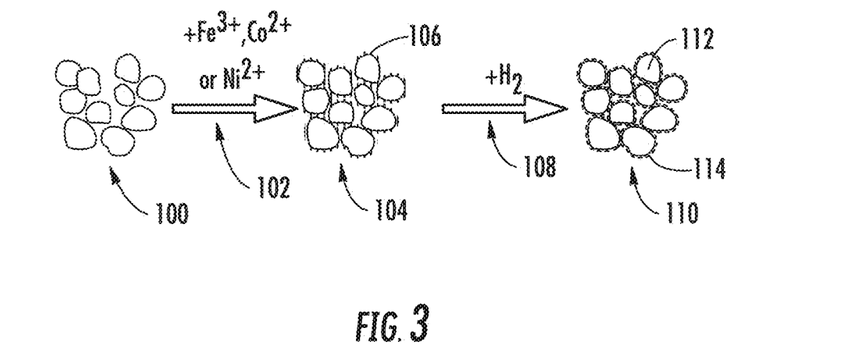
FIG. 3 is a somewhat schematic illustration of a method of fabricating nano-catalysts.

FIG. 3 presents a further alternate embodiment for forming metal-powder-based nano-catalysts. The process starts with a metal powder 100. In some embodiments the metal powder 100 may be pre-treated with an acid (such as hydrochloric acid) to activate its surface. Then as depicted in FIG. 3 the metal powder 100 may be washed with a metal-ion-containing solution 102 (e.g., a metal chloride salt solution) that typically comprises ions of iron (e.g., Fe$^{3+}$), cobalt (e.g., Co$^{2+}$) or nickel (e.g., Ni$^{2+}$), or combinations of two or more such ions. Metal nitrate salts (e.g., ferric nitrate) may also be used. Some beneficial synergism has been observed in solutions containing two or more such ions, particularly where the metal powder 100 is NiAl. Typically, the metal-ion containing solution 102 is formed from a metal salt and an acid that includes the anion of the metal salt. That is, when the metal salt is a chloride salt, the acid is hydrochloric acid; when the metal salt is a nitrate, the acid is nitric acid; when the metal salt is a sulfate, the acid is sulfuric acid, and so forth. In some embodiments AlCl$_3$ may be added to provide an excess of Cl$^-$ ions, which are useful for breaking up any Al$_2$O$_3$ that may be present. Al$^{3+}$ ions are preferably included in the wash solutions to create catalysts, and AlCl$_3$ may be used to break up oxide coatings on aluminum, and/or to act as an acid as a Lewis acid, or/and to generate HCl acid. AlCl$_3$ hydrolyzes in water to form HCl acid which is an etchant for many metals helping to form catalytic features. It is a favorable species in aqueous metal salt solutions. AlCl$_3$ in water (aqueous solutions) also provides [Cl]$^-$ ions or/and [AlCl$_4$]$^-$ ions which are reactive in the depositions of the metal catalytic spots or dots on the larger, micron-sized powder and substrate surfaces.

Also, whereas a fresh aqueous solution of FeCl$_3$ is naturally acidic, over time, the pH may increase as colloidal iron hydroxide (ferrous hydroxide) is formed. These colloids may precipitate and cause problems. To reduce the formation of such colloids it is advantageous to adjust the pH of a FeCl$_3$ solution to a pH less than approximately three. The addition of dilute hydrochloric acid is the preferred method of reducing the pH. Using 0.1 M HCl or another weak acid solution (instead of water) as the washing medium stabilizes the Fe$^{3+}$ ions and prevents their conversion to Fe$^{2+}$. When nitrate salts are used, dilute nitric acid is preferable as the washing medium.

The foregoing washing process produces a loaded metal powder 104. That is, the loaded metal powder 104 is a metal powder having metal ions 106 attached thereto. The loaded metal powder 104 is then separated from the supernatant metal chloride ion solution and dried either by air drying or a vacuum. The metal ions 106 on the loaded metal powder 104 may be reduced while at a temperature ranging from about 400° C. to about 1200° C., and typically about 600° C., typically using a hydrogen gas atmosphere 108 that is typically 4% H$_2$ and 96% Ar, typically heated to about 600° C.

The reduction process typically takes about 5 minutes but longer process times ranging from about 30 minutes to about 2 hours may be beneficial. The result is metal-powder-based catalyst 110 that comprises a metal powder 112 with surface metal nanoparticle catalysts 114.

As an example of the embodiment of FIG. 3 a metal powder, such as 10 gr. of NiAl powder, may be mixed with a metal salt solution, such as 10 mL of 0.001M-1M (typically 0.1M) $FeCl_3$, and optionally a chelating agent such as EDTA. Typically the mixing includes several (typically two) hours of ultrasonic agitation or ball milling for 1 to 10 minutes. This process attaches metal ions (in this case, iron ions) to the metal (in this case NiAl) powder to create a metal-powder-based nano-catalyst. The solution may then be allowed to stand for several minutes up to several days (typically a few hours) to allow the metal-powder-based nano-catalysts to settle. The metal-powder-based nano-catalysts may then be separated from the solution (such as by filtering and drying in a vacuum or evaporating the solvent) to form loaded metal powder. The loaded metal powder may be dried in a drying oven, typically at approximately 70° C.-80° C., or dried in air or in a vacuum. The metal ions that are attached to the metal powder may be contacted with an inert gas such as argon gas containing about 4 wt. % hydrogen to reduce the metal ions to metal nanoparticles, wherein the metal-powder-based nano-catalysts are formed.

Processes similar to those described for forming powder-based nano-catalysts may be used for fabrication of a solid-based nano-catalyst. Solid-based nano-catalysts have metal nano-particles disposed adjacent the surface of a substrate material having the shape of a geometric solid. The substrate may, for example, be a fully-dense or a porous wafer, plate, rod, honeycomb, a foam such as a carbon or metal foam or other geometric three-dimensional body, or a similar structure. Small granular materials may be used as substrates for solid-based nano-catalysts. The distinction between (a) "powder-based" nano-catalysts and (b) "solid-based" nano-catalysts that use granular substrates is based on the diameter of the substrate. Generally, if the diameter of a substrate particle is less than approximately 100 micrometers the resultant nano-catalyst is characterized as "powder-based," whereas if the diameter of a substrate particle is greater than approximately 100 micrometers the resultant nano-catalyst is characterized as "solid-based." A powder or a solid substrate upon which nanoparticles are formed to produce nano-catalyst materials is referred to as a support material. The support material may comprise metal, such as NiAl, ceramic, a cermet, or silicon or other metalloid.

In a typical process for forming a solid-based nano-catalyst a silicon wafer is washed, activated, and then modified by using a chelating agent to bind metal ions to the surface of the wafer. In alternate embodiments the silicon wafer may be replaced by a silicon structure having a different solid geometry, or may be replaced by a solid structure comprising a different material such as a different metalloid, a ceramic, or a metal. When the substrate is a metal or a metalloid the nano-catalyst is referred to as a metal-solid-based nano-catalyst, and when the substrate is a ceramic the nano-catalyst is referred to as a ceramic-solid-based nano-catalyst. The metal ions that are bound to (as in a chemical ionic bond or a chemical covalent bond or a chemical coordinate covalent bond or a chemical attraction resulting from electro-negative/positive effects) the surface of the solid substrate are then reduced by hydrogen reduction in the solid phase at high temperature to produce metal nanoparticles on the silicon wafer.

Figure 4:
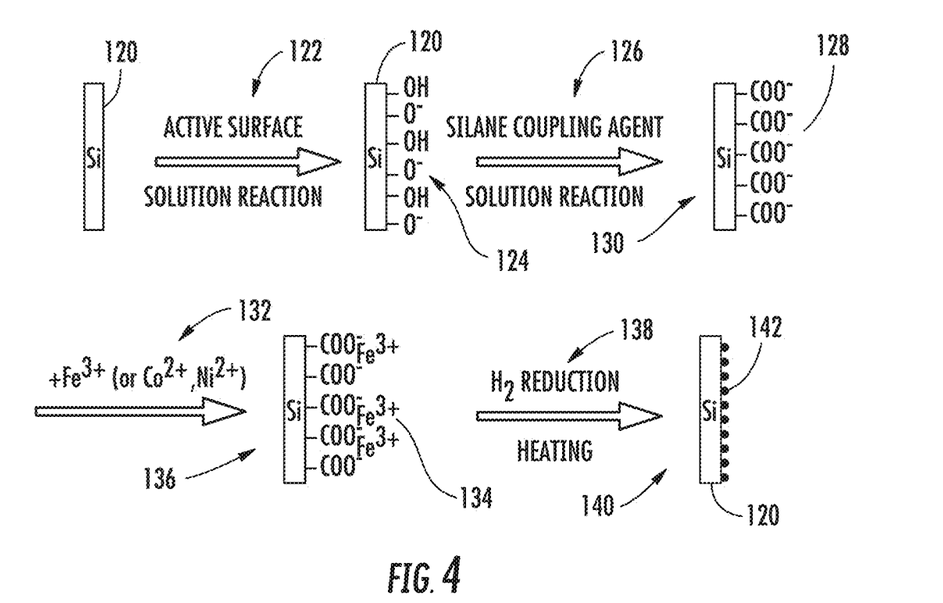
FIG. 4 is a somewhat schematic illustration of a method of fabricating nano-catalysts.

FIG. 4 presents a more detailed illustration of a process for forming a solid-based nano-catalyst. In the embodiment of FIG. 4 a silicon substrate 120 is prepared by washing the substrate in baths of one or more of the following chemicals: ethanol, acetone, chloroform, and water (each in turn), typically using ultrasonic agitation of the bath to enhance cleaning effectiveness. Then in step 122 the surface of the silicon substrate 120 may be exposed to dilute (from about 0.1 to about 2 molar) nitric acid, typically for a time ranging from about 30 minutes up to about 6 hours. Following exposure of the silicon substrate 120 to the nitric acid, as a further portion of step 122, any residual nitric acid on the silicon substrate may be removed by washing the silicon substrate, typically with water and ethanol. The step 122 develops an active surface 124 for further surface modification. An active surface is characterized as a surface that may be reacted with a coupling agent to form carboxyl groups on the surface.

In step 126 the active surface 124 of the silicon substrate 120 is exposed to a coupling agent that typically comprises a mixture of a silane compound and chloroform, which provide carboxyl functional groups. An exposure ranging from about one hour up to about 12 hours is typically sufficient to attach surface functional groups 128 and form a functionalized substrate 130. Any excess coupling agent may be removed by washing with deionized water or ethanol. As illustrated by step 132, the functionalized substrate 130 may then be exposed to a dilute metal salt solution, e.g., a solution ranging from about 0.001 to about 1 molar $FeCl_3$, to load the surface of the functionalized substrate 130 with metal ions 134 (e.g., $Fe^{3+}$ ions, or $Ni^{+2}$ ions, or $Co^{-2}$ ions, or $Co^{-3}$ ions or combinations of two or more of the four) and form a loaded substrate 136. In a step 138 the metal ions 134 that are bound to (as in a chemical ionic bond or a chemical covalent bond or a chemical coordinate covalent bond or a chemical attraction resulting from electro-negative/positive effects) the functionalized substrate material are reduced, typically by placing the metal ions 134 on the loaded substrate 136 under flowing $H_2$ at a temperature greater than about 400° C. (e.g., ranging from about 400° C. up to about 1200° C., typically about 600° C.) to form the nano-catalyst 140 as metal nanoparticles 142 on the silicon substrate 120.

It should be noted that the processes for production of powder-based nano-catalysts may be adapted for production of solid-based nano-catalysts by substituting solid substrate material for the powder substrate material. Similarly the processes for production of solid-based nano-catalysts may be adapted for production of powder-based nano-catalysts by substituting a powder substrate material for the solid substrate material.

In some embodiments where a substrate (either a powder-based or a solid-based substrate) comprising NiAl is used, an aqueous solution of an aluminum salt and a dilute acid (such as a chloride combination: $AlCl_3$+0.1M HCl, or a nitrate combination: $Al(NO_3)_3$+0.1 M $HNO_3$) may be used as an etchant to etch the surface of the substrate. In some embodiments the dilute acid may be used without a salt ($AlCl_3$ or $Al(NO_3)_3$). This etching process produces $Ni^{2+}$ ions in the etchant. Then drying the substrate in the presence of the etchant produces nano-size deposits comprising $Ni^{2+}$ ions which are reduced when heated under hydrogen to produce a nano-catalyst. In addition, this salt solution washing process works not just for NiAl substrates, but also for any nickel-containing substrate. Salt solution washes may also be used with carbon materials, such as foams. Furthermore, the salt solution washing process works for substrates comprising scandium, or titanium, or vanadium, or chromium, or manganese, or iron, or cobalt, or copper, or zinc as well as nickel.

Substrates containing such metals may be etched with an acid, an aqueous aluminum salt solution, or a mixture of an acid and an aqueous solution of an aluminum salt. In some processes, such as those using iron containing substrates (such as steel), dilute hydrochloric acid or dilute sulfuric acid may perform better than other acids. It is generally beneficial to use dilute acids. For example, concentrated nitric acid may undesirably passivate some substrates comprising scandium, or titanium, or vanadium, or chromium, or manganese, or iron, or cobalt, or nickel, or copper, or zinc.

Further, note that any etchant that is typically used in microscopy to evolve the grain structure of a metal will work for that metal. In some embodiments, the etchant solution may include ethanol instead of water and/or a glycerol addition for better wetting. The following are examples of etching processes that may be used for iron- and iron-alloy-containing materials:

a. Etch an iron- or iron-alloy-containing powder or solid substrate in 100 ml of ethanol+1-10 ml nitric acid (not to exceed 10% nitric acid) for a few seconds up to a few minutes.
 b. Etch an iron- or iron-alloy-containing powder or solid substrate in 50 ml cold-saturated (in distilled water) sodium thiosulfate solution and 1 gr. potassium metabisulfite; immersion at room temperature for approximately 40 seconds to 120 seconds.
 c. Etch an iron- or iron-alloy-containing powder or solid substrate in 80 ml ethanol+10 ml nitric+10 ml hydrochloric acid+1 gr. Picric acid for a few seconds up to a few minutes.
 d. Etch an iron- or iron-alloy-containing powder or solid substrate in 30 gr. $K_3Fe(CN)_6$+30 gr. KOH+150 ml $H_2O$ (1 second to several minutes). Note, the potassium hydroxide should be mixed into the water before adding $K_3Fe(CN)_6$.
 e. Etch an iron- or iron-alloy-containing powder or solid substrate in 20-30 ml HCl+1-3 ml selenic acid+100 ethanol at room temperature for 1-4 minutes.
 f. Etch an iron- or iron-alloy-containing powder or solid substrate in 45 ml Glycerol+15 ml $HNO_3$+30 ml HCl for a few seconds up to a few minutes.
 g. Etch an iron- or iron-alloy-containing powder or solid substrate in 10 gr. $K_3Fe(CN)_6$+10 gr. KOH+100 ml water for a few seconds up to a few minutes.

When a powder-based or a solid-based substrate is washed (etched) with an acid, an aqueous aluminum salt solution, or a mixture of an acid and an aqueous solution of an aluminum salt, the metal ion (salt) precipitates out as nano-size spots or dots. Then the metal ions are reduced to the "free" or uncharged state to form metal nano-catalysts when heated under a hydrogen gas flow. In some embodiments where such nano-catalysts are used to produce carbon nanotubes the hydrogen gas flow is applied both (a) during the reduction of the precipitated metal ions (nano-size spots or nano-size dots) to metal nano-catalysts and also (b) during a subsequent ethanol (or other organic) gas flow over the nano-catalysts to form carbon nanotubes. Having hydrogen present during the formation of carbon nanotubes prevents the catalysts from becoming "dead" and allows the metal nanoparticles to remain active as catalysts for extended periods of time thereby allowing the high volume of carbon nanotubes to be grown. This process makes the catalysts very efficient. The same technique of flowing hydrogen gas during the formation, growth and production of carbon nanotubes may be applied to processes using other nano-catalysts that were generated by mechanical, thermal, or chemical means to prolong the "active life" of the catalysts and thus prolong the growth/production of carbon nanotubes.

EXAMPLES

Figure 5:
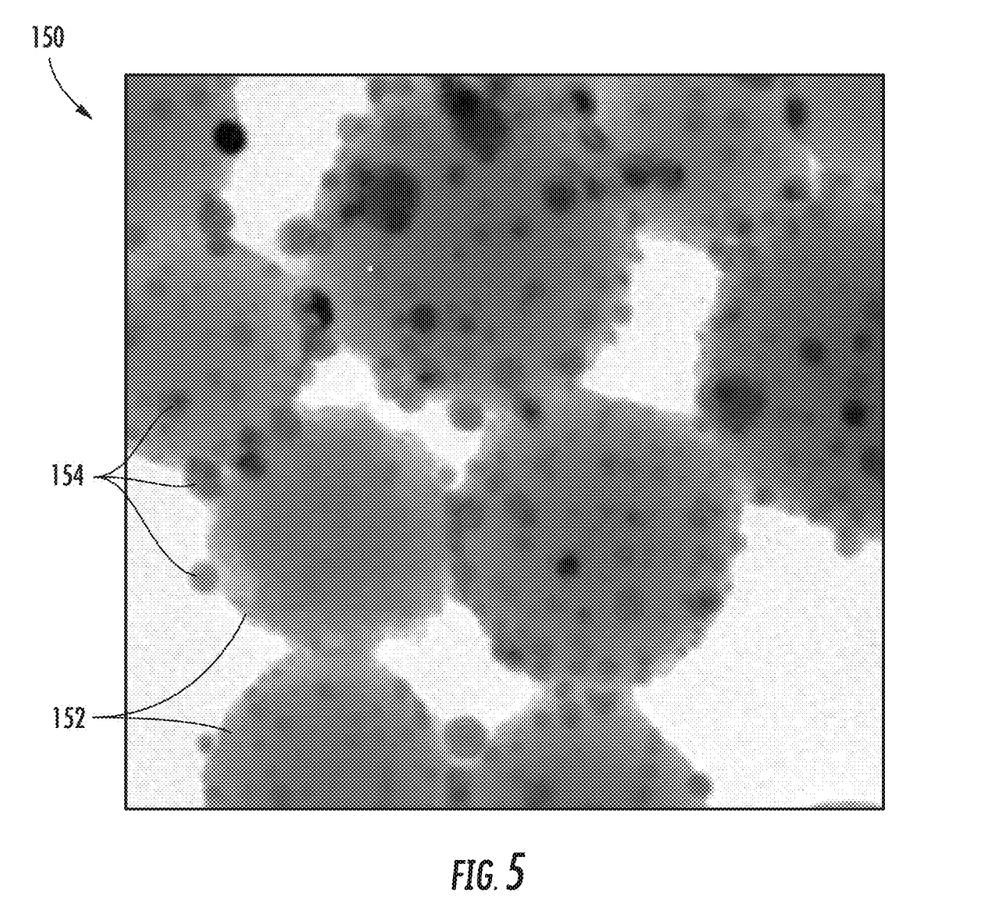
FIG. 5 is a photomicrograph of nano-catalysts.

FIG. 5 depicts an example of ceramic-powder-based nano-catalysts 150. Silicon dioxide spheres 152 have iron nanoparticles 154 disposed adjacent the surface of the silicon dioxide spheres 152. The silicon dioxide spheres 152 range in diameter from about 10 nm to about 10 microns (typically 50 nm-500 nm) and the iron nanoparticles 154 range in diameter from approximately 1 nm up to about 10-30 nm, but some iron nanoparticles 154 may be as large as 50 nm. The nano-catalysts 150 were fabricated by preparing a microemulsion media using polyethylene glycol p-tert-octylphenyl ether, hexanol, cyclohexane, and water. This water-in-oil microemulsion served as a nanoreactor to confine the resulting nanoparticle sizes. Ceramic nanospheres were grown in the microemulsion by hydrolysis of organic tetraethoxysilane (TEOS) in the presence of an ammonia ($NH_3$) catalyst. The reaction produced amorphous, spherical nanoparticles of $SiO_2$. The $SiO_2$ surfaces were then modified by hydrolysis of the organic silane with functional groups to enhance the affinity of the $SiO_2$ surfaces for metal ions. The functionalized silica particles were then exposed to a dilute solution of $FeCl_3$ wherein $Fe^{3+}$ ions were substantially homogeneously adsorbed on the surface of the $SiO_2$ particles by attachment to the —COO− functional groups. The metal ions were then reduced in the presence of hydrogen at high temperature forming the iron nanoparticles 154 adjacent the surface of the silicon dioxide spheres 152.

Figures 6A, 6B:
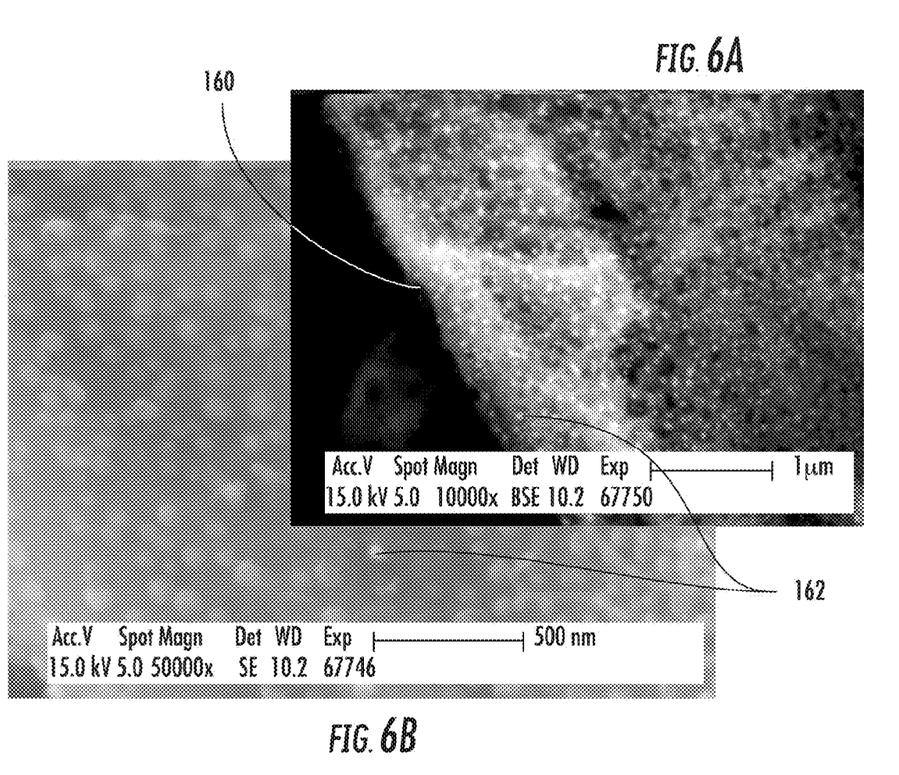
FIGS. 6A and 6B are photomicrographs of nano-catalysts.

FIGS. 6A and 6B depict scanning electron microscope images of NiAl particles 160 having Fe nano-catalyst particles 162 disposed on the surfaces thereof. FIG. 6A is a backscattered electron image.

Solid-based and powder-based nano-catalysts may be used to grow nanostructures, and in particular to grow carbon nanotubes. Nanostructures that are grown are attached to the nanoparticles that have been formed on the nano-catalysts, typically using a process described previously herein. These nanostructures may be grown at temperatures starting as low as 450° C., although around 600° C. is better and preferably the nanostructures are grown at higher temperatures, typically ranging from about 600° C. to about 1200° C. In a typical embodiment, single-wall or multi-wall carbon nanotubes may be grown on a powder-based nano-catalyst. The powder-based nano-catalyst is placed in a process vessel and loaded into a furnace. A quartz tube is typically used as the process vessel because quartz is chemically inert and tolerant of high temperatures, and various sizes of quartz tubes are readily available. High temperature corrosion-resistant metals (such as Inconel) or ceramics may also be used to fabricate suitable process vessels. A vacuum is drawn and the nano-catalyst is heated to a target temperature ranging from about 500° C. to about 1500° C., with 600° C. being typical. The specific target temperature is designed to approach but not exceed the lower of the melting temperature of the powder or the nanoparticles formed on the powder. Various sources of heating may be used. Infrared heating using a quartz tube is beneficial because quartz is substantially transparent to infrared radiation, so that almost all of the heating energy passes through the process vessel and is absorbed by the reacting materials. Microwave heating may also be used, preferably with a microwave-transparent process vessel.

In alternate embodiments an inert gas may be used instead of the drawing a vacuum in the furnace. The term "protective atmosphere" is used herein to refer to either a vacuum or an inert gas. The target temperature is maintained for about ten minutes while an organic vapor, such as ethanol vapor, is flowed through the furnace at a flow rate ranging from about 100 cc/minute to about 10 L/minute (depending on the volume of the chamber), typically about 100 cc/minute to about 150 cc/minute. Typically this establishes an organic vapor process pressure of ranging from about 1 torr to about 1000 torr, typically about 400 torr, within the tube furnace for about a ten minute duration. During this process nanostructures attach to and grow on the nanoparticles adjacent the surface of the powder particles. The resultant nano-catalyst/nanostructure constructs are referred to herein as anchored nanostructure materials. The rate of growth and physical attributes of these anchored nanostructure materials may be varied by adjusting the organic vapor pressure, the flow rate, the temperature, the time of exposure, and the concentration of nanoparticles adjacent the surface of the powder particles. After a desired amount of growth is complete, the organic vapor exposure is discontinued, the anchored nanostructure material is removed from the furnace hot zone to a near-room temperature zone (within the quartz tube) while maintaining a protective atmosphere. The quartz tube and its contents are allowed to cool under a protective atmosphere to a temperature at which the anchored nanostructure material does not significantly oxidize in an ambient atmosphere. Then the anchored nanostructure materials may be removed from the quartz tube.

These nanostructure materials are sometimes referred to as being formed "in-situ" because the formation of the nanostructures (e.g., carbon nanotubes) on individual powder particles occurs on powder particles that may subsequently be used to fabricate composite materials that incorporate the anchored nanostructure material, without transferring the nanostructures to another material or powder for such use.

Figure 7A:
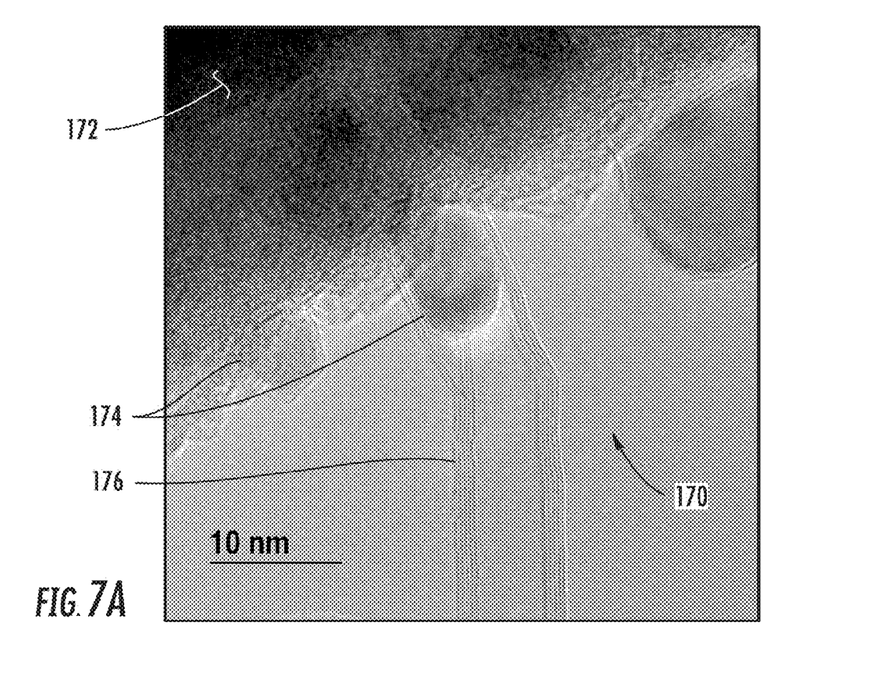
FIGS. 7A and 7B are photomicrographs that each depicts a portion of single anchored nanostructure formation.

FIG. 7A is a photomicrograph that depicts a portion of an anchored nanostructure formation 170. The anchored nanostructure formation 170 has an NiAl powder particle 172 with a plurality of Fe (iron) nanoparticles 174 disposed adjacent the surface of the NiAl powder particle 172. A nanostructure, in this case multi-wall carbon nanotube 176, is attached to one of the nanoparticles 174. In many embodiments a plurality of nanostructures may each be attached to one of a plurality of nanoparticles that are disposed adjacent the surface of a powder particle, such that the nanostructures are anchored to the surface of the powder particles.

Figure 7B:
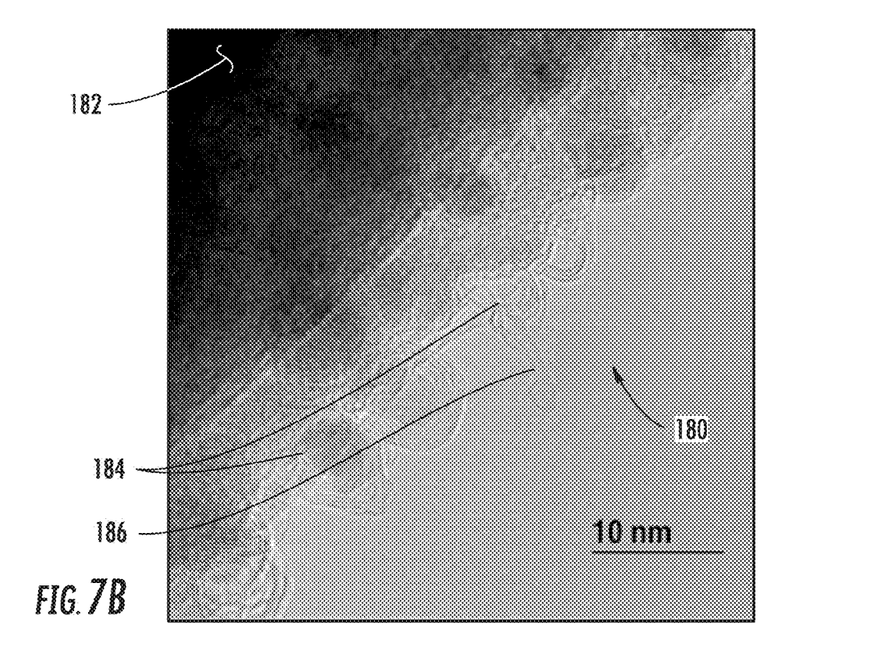

FIG. 7B is a photomicrograph that depicts a portion of an anchored nanostructure formation 180. The anchored nanostructure formation 180 has a metal powder particle 182 with a plurality of Fe (iron) nanoparticles 184 disposed adjacent the surface of the metal powder particle 182. A nanostructure, in this case a single-wall carbon nanotube 186, is attached to one of the nanoparticles 184.

Figure 8A:
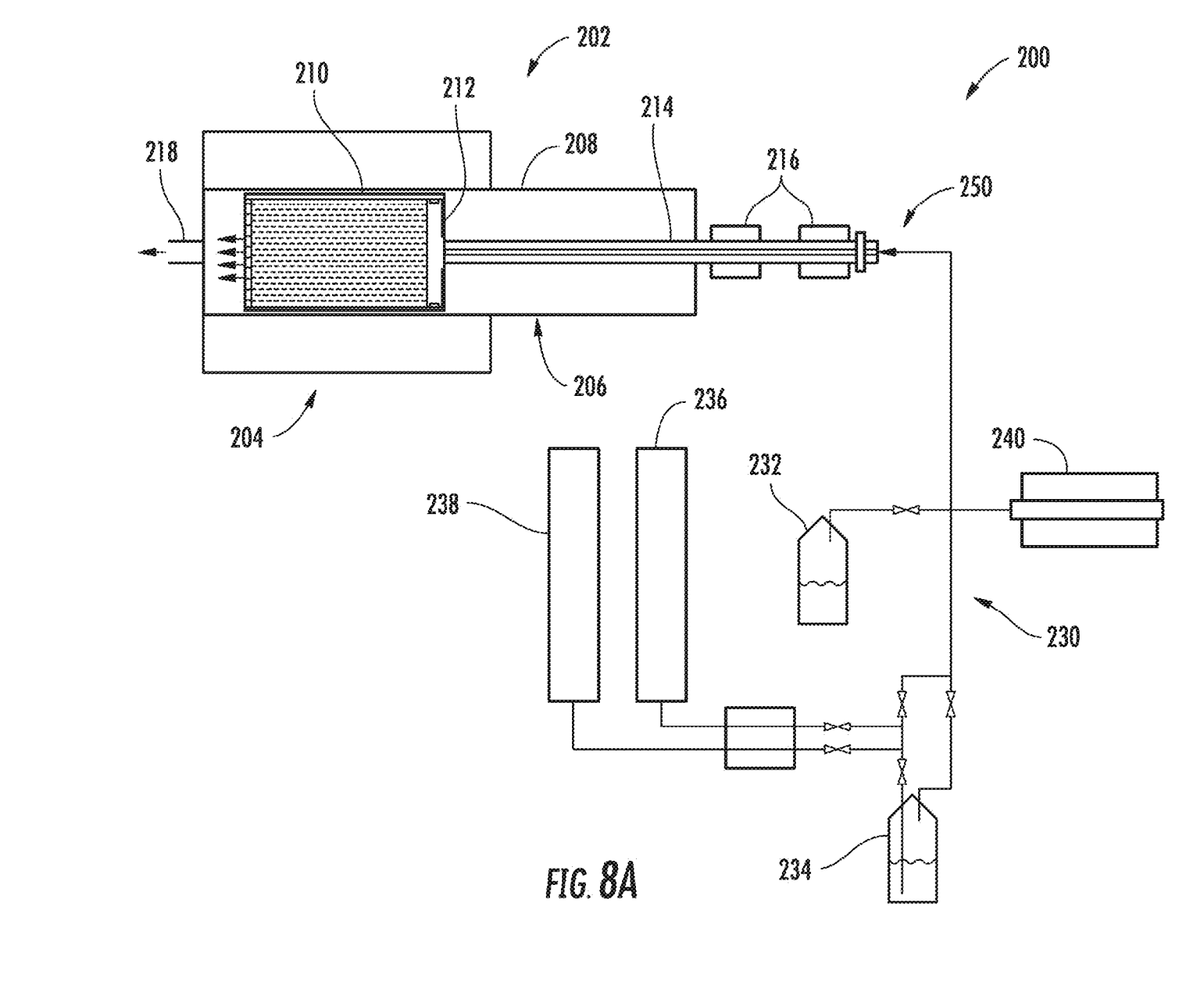
FIG. 8A is a schematic diagram of a fabrication system for producing anchored nanostructure materials.

FIG. 8A presents a schematic diagram of a fabrication system 200 for producing anchored nanostructure materials. Fabrication system 200 includes a furnace 202 that has a hot zone 204 and a transfer zone 206. The furnace 202 includes a cylindrical quartz tube 208 that is configured to house a cylindrical process vessel 210 that also may be fabricated from quartz. The cylindrical process vessel 210 may include a peg-lock end cap 212, or a similar structure, to facilitate the loading of nano-catalysts into the cylindrical process vessel 210, and the removal of anchored nanostructure materials from the cylindrical process vessel 210 after processing. A cylindrical hollow quartz shaft 214 is provided to move the cylindrical process vessel 210 between the transfer zone 206 and the hot zone 204 of the furnace 202. The cylindrical hollow quartz shaft 214 passes through a pair of bearings 216 that permit axial and rotational movement of the cylindrical hollow quartz shaft 214 and the cylindrical process vessel 210. An evacuation port 218 is provided in the furnace 202, and the evacuation port 218 may be used to provide a vacuum in the cylindrical process vessel 210. The evacuation port 218 may also be use to extract process gases from the cylindrical process vessel 210, so that a flow of process gases is maintained through the cylindrical process vessel 210.

Fabrication system 200 also includes a process gas system 230. The process gas system typically includes a source of ethanol 232. A source of water vapor 234 may also be provided. Typically for processes used to fabricate anchored carbon nanotubes, the water vapor 234 is supplied at a rate of about 50 to 500 parts per million by decomposition of ethanol that is used to grow the carbon nanotubes. The water vapor oxidizes away any carbon that is not a nanostructure. In some embodiments a mixture 236 of methane and air (in approximately a 50:50 ratio) may be provided as well as a source of auxiliary gas 238. Methane may be used as an alternative or supplement to ethanol as a source of carbon for growing carbon nanotubes. A gas stream monitoring system 240 may be provided to monitor levels of oxygen, water vapor, hydrogen, carbon monoxide, methane, etc. The gas from process gas system 230 is provided to the cylindrical hollow quartz shaft 214 at a coupling 250.

In an exemplary embodiment, a powder-based nano-catalyst (e.g., 34 of FIG. 1) is disposed within a "boat" such as cylindrical process vessel 210 of FIG. 8A. The cylindrical process vessel 210 is positioned in a "cold zone" (such as transfer zone 206 of FIG. 8A) and then moved into the "hot zone" (e.g., 204 of FIG. 8A) of a furnace (e.g., 202 of FIG. 8A) via a feed-thru device (e.g., quartz tube 208 of FIG. 8A) under a protective atmosphere. A flowing mixture of ethanol (e.g., from source 232 of FIG. 8A) and hydrogen and argon (e.g., from auxiliary source 238 of FIG. 8A) at between 500° C. to 1500° C. (about 600° C. is typical) at ~100 cc/minute to establish a pressure of approximately 400 torr within the tube furnace for a duration of about 15 minutes (although time durations may be less or may extend up to about 24 hours). This grows carbon nanotubes on the powder-based nanocatalysts. Water vapor (e.g., from source 234 of FIG. 8A) may be added to oxidize carbon that is not formed as nanotubes. The powdered nano-catalysts with anchored carbon nanotubes are moved back to the cold zone (e.g., transfer zone 206 of FIG. 8A) and cooled while maintaining the protective atmosphere. After cooling, the powder-based nano-catalysts with anchored carbon nanotubes may be removed from the process vessel (e.g., 210 of FIG. 2).

Figure 8B:
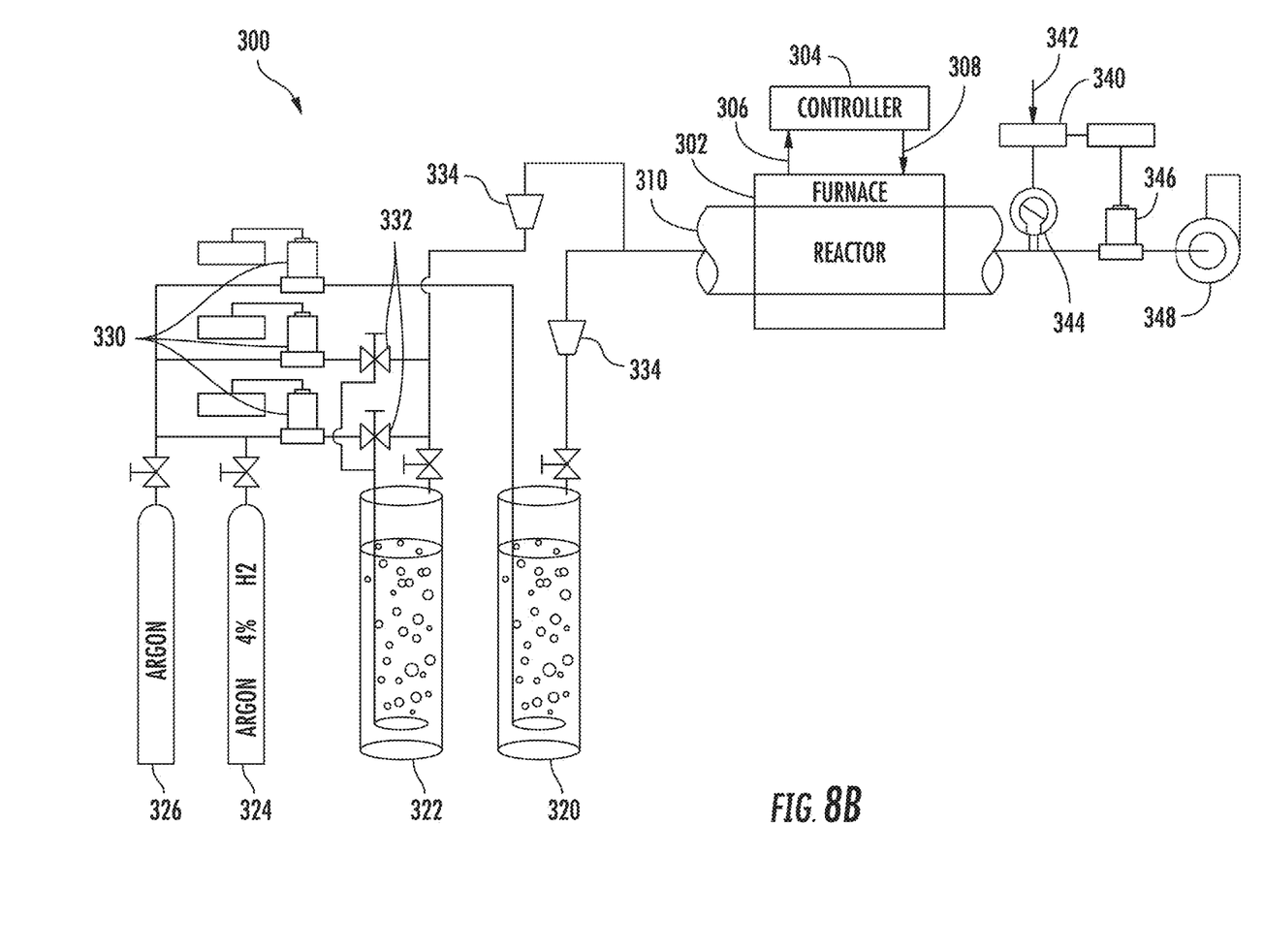
FIG. 8B is a schematic diagram of a simplified fabrication system for producing anchored nanostructure materials.

FIG. 8B illustrates a further embodiment of an apparatus 300 for manufacturing anchored nanostructure materials. The apparatus includes a furnace 302 that is operated by a controller 304. A thermocouple 306 provides temperature information to the controller 304 and the controller 304 drives a power line 308 to control the temperature of the furnace 302. The furnace 310 is configured for heating a reactor vessel 310. Various gas delivery systems are provided. One gas delivery system is an ethanol tank 320 and a water tank 322. The ethanol tank 320 and the water tank 322 are typically wrapped with heat tape to raise the temperature of their contents to a temperature ranging from room temperature to the boiling point. Porous frits may be disposed in the tanks to enhance thermal stability and to disperse the gas, increasing contact area with the content, thus, allowing the gas to act as a carrier or "pickup" of the liquid. Further gas delivery systems include argon/hydrogen tanks 324 and an argon purge gas tank 326 for controlling the atmosphere in the furnace 302. Flow controllers 330 are provided in conjunction with a system of valves 332 (two typical valves are labeled in FIG. 8B) and rotameters 334 to control gas flow. A pressure controller 340 with a set point adjustment 342, a pressure gauge 334, and a mass flow controller 346 are used to control the pressure in the reactor through a vacuum pump 348.

The apparatus 300 of FIG. 8B is operated in the manner described for the operation of the fabrication system 200 of FIG. 8A, with a furnace 302 temperature ranging from about 450° C. to about 1200° C. (typically 600° C.) and gas flow rates ranging between 100 and 1000 cc/min (typically 125-150 cc/min). Water vapor concentration is provided in a range from about 50 to 500 ppm.

Anchored nanostructure materials may be used to form nano-structure composite materials that have a binder material and a fiber material. For example, a precursor material may be formed using a mixture of at least one ceramic or metal powder and anchored nanostructure materials. Where a metal powder is used, the metal powder mixture may be (a) Ni powder and (b) NiAl powder. The anchored nanostructure materials may comprise (i) NiAl powder as a support material and (ii) carbon nanotubes attached to nanoparticles adjacent to a surface of the support material. The carbon nanotubes form the fiber portion of the nano-structure composite material. The ceramic or metal powders (e.g., the Ni and NiAl powders) along with the metal powder support material of the anchored nanostructure materials form the binder material of the nano-structure composite material. When Ni and NiAl are used in the metal powder mixture, a preferable combination is formulated by adjusting the constituent ratios so that the Ni powder, the NiAl powder, and the anchored nano-structured materials are mixed in a stoichiometric ratio that is selected to yield $Ni_3Al$ as the binder material after sintering. The anchored nano-structured materials generally comprise between about 5 wt. % and about 50 wt. % of the nanotubes and support mixture that is sintered, with about 10 wt % being typical. More specifically, if NiAl powder particles form the substrate material for nano-catalysts and carbon nanotubes are formed on NiAl powder particles, the carbon nanotubes typically comprise about 10 wt. % of the NiAl powder with attached carbon nanotubes, but the carbon nanotubes may comprise as much as 50 wt. % of the NiAl powder with attached carbon nanotubes. The NiAl powder with attached carbon nanotubes may then be mixed with nickel powder in an amount that the resultant mixture contains from about 0.5 wt. % to about 50 wt. % carbon nanotubes, but typically the mixture comprises between about 0.5 wt. % and 5 wt. % carbon nanotubes.

The process of forming nano-structure composite materials typically involves sintering the mixture under vacuum in a die. Generally a sintering temperature ranging from about 1300° C. to about 1400° C. is used with a die pressure ranging from about 8 KSI to about 12 KSI. A temperature of about 1340° C. and a pressure of about 10 KSI are typical process parameters. The mixture is sintered until it consolidates to form the nano-structure composite material.

In other embodiments a mixture of at least one powder and anchored nanostructure materials may be formed with a binder as a "green" shape and then subsequently sintered. In other embodiments a mixture of at least one powder and anchored nanostructure materials may be formed with a binder and then hot pressed and sintered in one continuous process. In further embodiments other metallurgical forming processes such as casting, extruding, forging, and pressing may be use to form nanostructure composites by incorporating in-situ fabrication of carbon nanotubes anchored directly to powder support materials.

Figure 9:
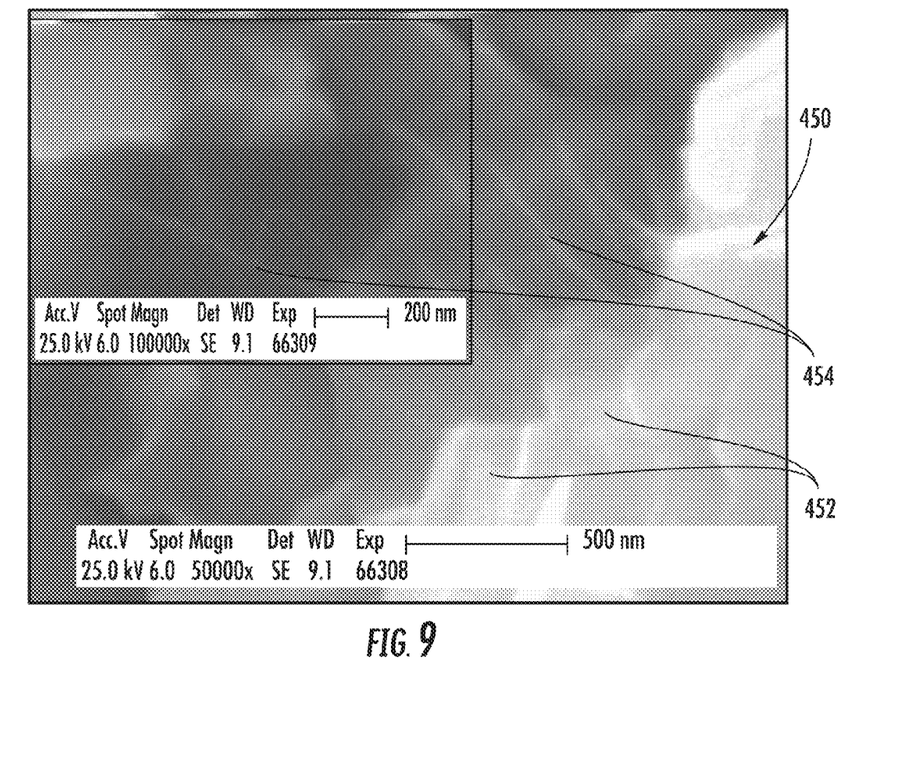
FIG. 9 is a photomicrograph of a fracture surface of a composite material formed with anchored nano structures.

FIG. 9 depicts a composite material 450 formed with anchored nanostructures. The composite material 450 includes grains of $Ni_3Al$ 452 that have nanostructures 454 anchored to nanoparticles on the grains of $Ni_3Al$ 452. The $Ni_3Al$ is the binder material in the composite material 450. The nanostructures 454 are the fiber material in the composite material 450 and in this case the nanostructures 454 are carbon nanotubes. Prior to sintering the nanostructures 454 were attached to the nanoparticles that were disposed adjacent the surface of NiAl powder particles of a nano-catalyst material. During sintering some or all of the NiAl powder may be converted to $Ni_3Al$, depending on the availability of free Ni to effect the conversion. However, in any case, the nanostructures remain dispersed in the sintered composite material to strengthen the composite structure.

Figure 10A:
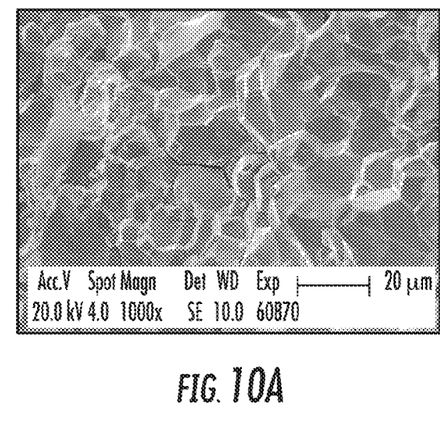
FIG. 10A is a photomicrograph of a fracture surface of a $Ni_3Al$ alloy.
Figure 10B:
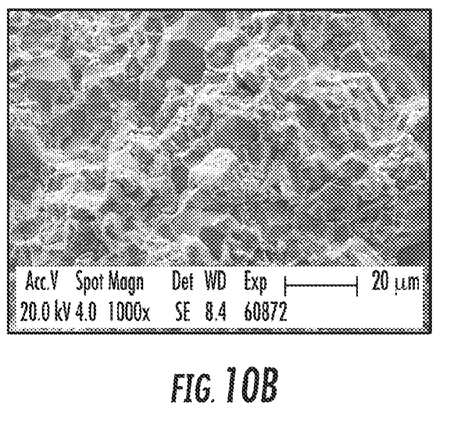
FIG. 10B is a photomicrograph of a fracture surface of a $Ni_3Al$ composite formed with anchored nano structures.

FIG. 10A depicts a fracture surface of a $Ni_3Al$ alloy. Distinct grain boundaries are evident, indicating that these boundaries are the "weak link" in the structure of the material. Also, small fissures between some grains are evident. FIG. 10B depicts a fracture surface of a $Ni_3Al$ composite formed using anchored nanostructures.

Figure 11A:
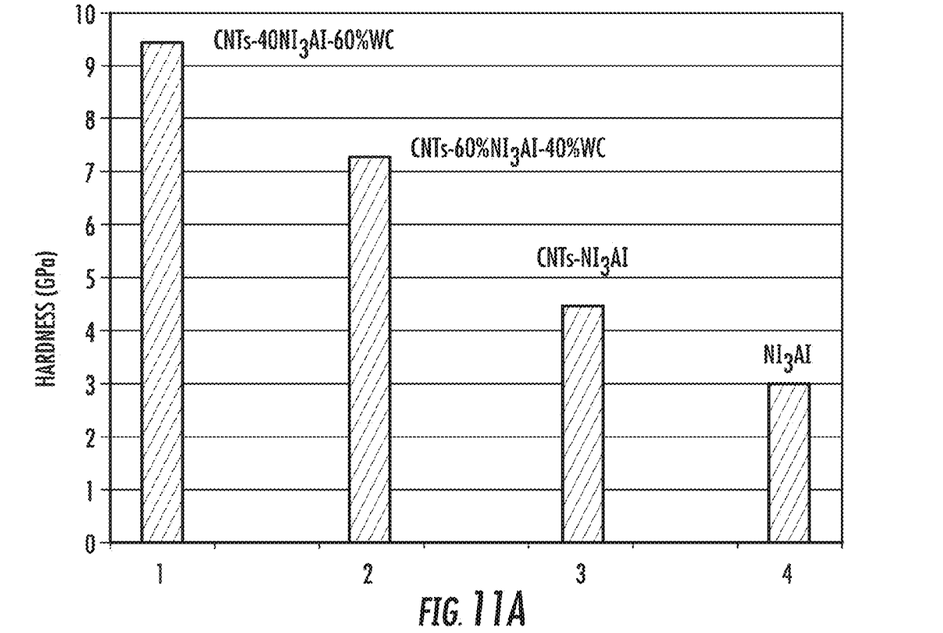
FIGS. 11A and 11B are charts depicting physical properties of various composite materials.

FIG. 11A presents data on the comparative hardness of (a) two composite materials (bars number 1 and 2) that contain tungsten carbide (WC) and $Ni_3Al$, formed using anchored carbon nanotube (CNT) nanostructure material, and (b) a composite material (bar 3) that contains $Ni_3Al$ formed with anchored CNT nanostructure material, and (c) substantially pure $Ni_3Al$ alloy (bar 4). While forming a composite material using anchored CNT material (bar 3) shows a hardness improvement over $Ni_3Al$ alloy (bar 4), the addition of about 40 or about 60 vol. % of tungsten carbide (bars 2 and 1 respectively) further improves hardness.

Figure 11B:
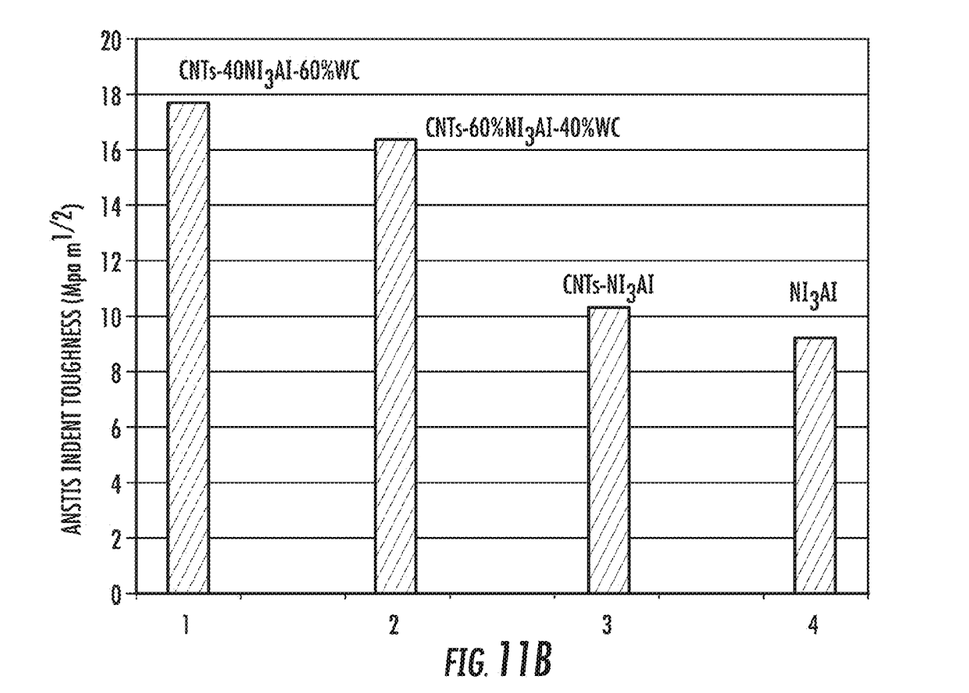

FIG. 11B illustrates improvements in Anstis indent toughness that are comparable to improvements in hardness depicted in FIG. 11A.

It should be noted that whereas examples have been provided herein for NiAl powder particles supporting carbon nanotubes that are mixed with Ni powder to form $Ni_3Al$-carbon nanotube composites, other metal powders, metal alloy powders, ceramic powders, and cermet powders may be used to anchor carbon nanotubes and used for in-situ carbon nanotube growth processes.

In summary, embodiments disclosed herein provide various methods for forming a nano-structure composite material using anchored nanostructure materials. The method typically includes forming a mixture of at least one metal powder and anchored nanostructure materials. Ni and NiAl may be used as the metal powders, and the anchored nanostructure materials may include (i) NiAl powder support material and (ii) carbon nanotubes attached to nanoparticles adjacent to a surface of the powder support material as the fiber material. Nano-structure composite material may be used to fabricate composite materials.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of forming a nano-structure composite material having a binder material and a fiber material, comprising:
   (a) forming a mixture comprising:
      1. at least one powder, and
      2. anchored nano-structured materials comprising (i) a metal powder support material, (ii) nanoparticles formed on a surface of the metal powder support material, and (iii) carbon nanotubes anchored directly to the surface of the metal powder support material and anchored directly to the nanoparticles on the surface of the metal powder support material; and
   (b) consolidating the mixture to form the nano-structure composite material wherein the at least one powder and the metal powder support material forms the binder material and the carbon nanotubes form the fiber material of the nano-structure composite material.

2. The method of claim 1 wherein the carbon nanotubes comprise between about 0.5 wt. % and about 5 wt. % of the mixture of step (a).

3. The method of claim 1 wherein the carbon nanotubes comprise between about 0.5 wt. % and about 50 wt. % of the mixture of step (a).

4. The method of claim 1 wherein the at least one powder comprises Ni powder and NiAl powder, and the anchored nano-structured materials comprise (i) NiAl powder support material, (ii) nanoparticles formed on a surface of the NiAl powder support material, and (iii) carbon nanotubes anchored directly to the surface of the NiAl powder support material and directly to the nanoparticles on the surface of the NiAl powder support material.

5. The method of claim 1 wherein:
   the at least one powder comprises Ni powder and NiAl powder, and the anchored nano-structured materials comprise (i) NiAl powder support material, (ii) nanoparticles formed on a surface of the NiAl support material, and (iii) carbon nanotubes anchored directly to the surface of the NiAl powder support material and directly to the nanoparticles on the surface of the NiAl powder support material; and
   the quantity of Ni powder and the quantity of NiAl powder and the quantity of anchored nano-structured materials are in approximately a stoichiometric ratio that is selected to predominantly yield $Ni_3Al$ as the binder material after sintering.

6. The method of claim 1 further comprising mixing a powder comprising tungsten carbide with the mixture of step (a) to form a combined mixture, and sintering the combined mixture per step (b).

7. The method of claim 1 further comprising mixing a powder comprising tungsten carbide with the mixture of step (a) to form a combined mixture, and sintering the combined mixture per step (b), wherein the tungsten carbide comprises between about 40 vol. % and about 60 vol. % of the combined volume of tungsten carbide and the mixture of step (a).

8. The method of claim 1 further comprising mixing a powder comprising boron carbide with the mixture of step (a) to form a combined mixture, and sintering the combined mixture per step (b).

9. The method of claim 1 further comprising mixing a powder comprising boron carbide with the mixture of step (a) to form a combined mixture, and sintering the combined mixture per step (b), wherein the boron carbide comprises between about 40 vol. % and about 60 vol. % of the combined volume of boron carbide and the mixture of step (a).

10. The method of claim 1 further comprising mixing a powder comprising diamond particles with the mixture of step (a) to form a combined mixture, and sintering the combined mixture per step (b).

11. The method of claim 1 wherein for each of the carbon nanotubes an inside wall of the carbon nanotube is anchored to one of the nanoparticles.

12. The method of claim 1 wherein the anchored nano-structured materials comprise between about 5 wt. % and about 50 wt. % of the mixture.

13. The method of claim 1 wherein the anchored nano-structured materials comprise about 10 wt. % of the mixture.

14. The method of claim 1 wherein the carbon nanotubes extend from the surface of the metal powder support material and around the nanoparticles whereby the carbon nanotubes are anchored directly to both the nanoparticle and to the metal powder support material.

15. The method of claim 1 wherein the metal powder support material is selected from a group consisting of Sc, Ni, Fe, Cr, Co, Ti, V, Mn, Cu, and Zn containing metals, alloys, and intermetallics.

16. The method of claim 1 wherein the metal powder support material is selected from a group consisting of Sc, Ni, Fe, Cr, Co, Ti, V, Mn, Cu, Zn, Y, Zr, Nb, Ru, Rh, Pd, Hf, Ta, W, Re, Ir, Pt, Au, Ce, Th, and U containing metals, alloys, and intermetallics.

17. The method of claim 1 further comprising contacting the metal powder support material with a solution including metal ions from a metal salt to form nanocatalysts, heating the nanocatalysts, and exposing the nanocatalysts to a flow of organic vapor to form the anchored nano-structured materials prior to forming the mixture.

18. The method of claim 1 further comprising contacting the metal powder support material with a solution including metal ions from a metal salt to form nanocatalysts and heating the nanocatalysts under vacuum to form the anchored nano-structured materials prior to forming the mixture.

* * * * *